(No Model.)
D. E. HERRINGTON.
SPRING TOOTH ATTACHMENT FOR CULTIVATORS.
No. 481,946. Patented Sept. 6, 1892.
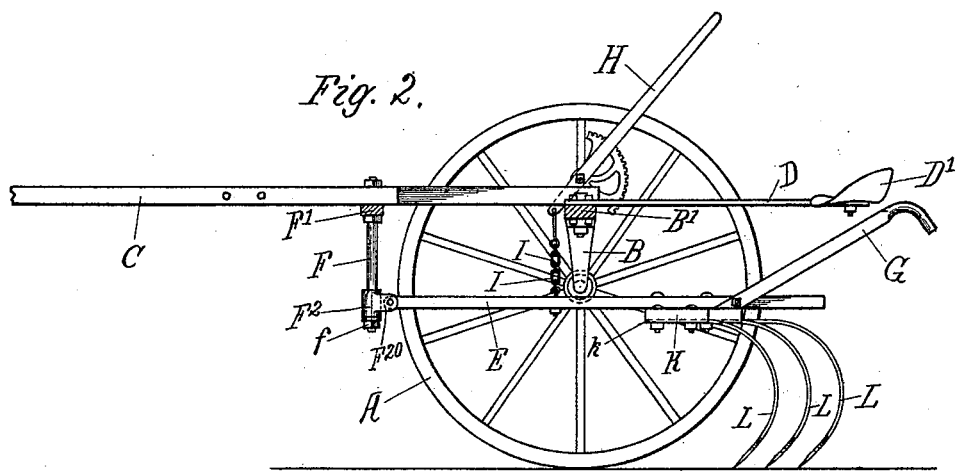
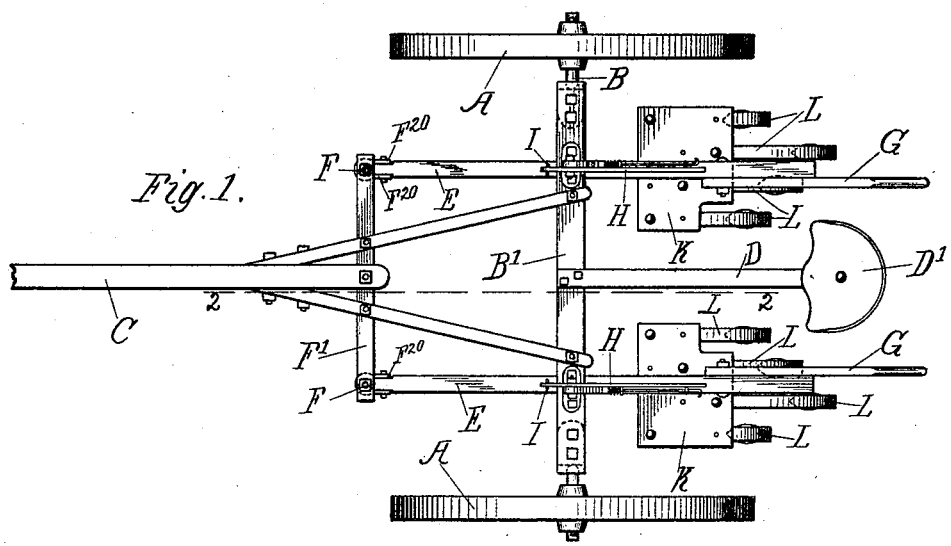
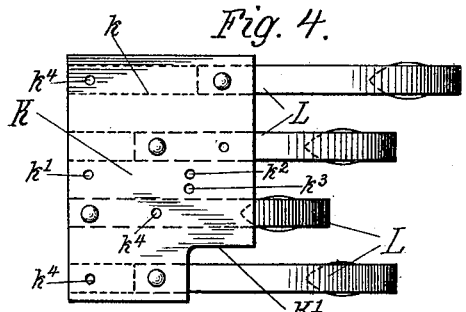
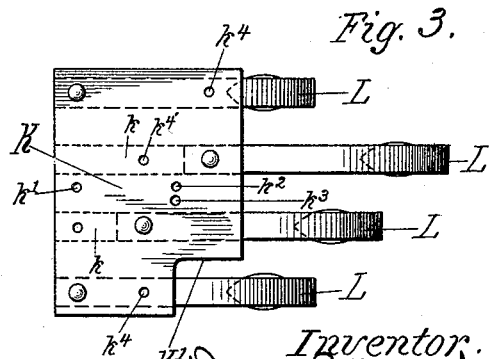
Witnesses
E. T. Wray.
Jean Elliott.
Inventor.
Dexter E. Herrington
By Burton and Burton
his attys

UNITED STATES PATENT OFFICE.

DEXTER E. HERRINGTON, OF GREENWOOD, ILLINOIS.

SPRING-TOOTH ATTACHMENT FOR CULTIVATORS.

SPECIFICATION forming part of Letters Patent No. 481,946, dated September 6, 1892.

Application filed May 31, 1892. Serial No. 434,947. (No model.)

*To all whom it may concern:*

Be it known that I, DEXTER E. HERRINGTON, a citizen of the United States, residing at Greenwood, county of McHenry, and State of Illinois, have invented certain new and useful Improvements in a Spring-Tooth Attachment for Cultivators, which are set forth in the following specification, reference being had to the accompanying drawings, forming a part thereof.

In the drawings, Figure 1 is a plan of a cultivator with my improved spring-tooth attachment. Fig. 2 is a section at the line 2 2 on Fig. 1. Figs. 3 and 4 are detailed plan views of the attachment with the spring-teeth differently arranged thereon.

This attachment is designed to be applied to any ordinary shovel-cultivator, and the cultivator represented in the drawings is a conventional form, with details omitted so far as they are not necessary to illustrate the use of the attachment.

A A are the supporting-wheels, and B the cranked skein, connected by the cross-beam B'.

C is the draft-pole rigidly attached to the cross-beam, and D the seat-bar rigidly attached to the same.

D' is the seat.

E E are the swing-bars or shovel-beams, to which the shovels or spring-teeth may be attached and to which my attachment is shown attached in the drawings. These swing-bars may have the usual free or loose pivotal connection to the draft-pole at the forward end, such connection being adapted to permit both vertical and horizontal movement at the rear end and, as conventionally illustrated, it is obtained by means of rods F F, projecting rigidly downward from the cross-bar F' and having at their lower ends the sleeves $F^2$, which have rotary motion on said rods and have pivoted to them on lugs $F^{20}$ the swing-bars E E, respectively.

The handles G G extend from the swing-bars in the usual direction and to the usual position with respect to the seat and serve as a means for swinging the bars laterally as occasion requires, and the levers H H, fulcrumed on the cross-beam B' and having flexible connection by chains or links I I to the swing-bars E E, respectively, and provided with familiar mechanism for latching the levers in adjusted position, serve to adjust the swing-bars vertically. As thus far described the matter does not involve my invention and constitutes only a conventional or generic form of cultivator.

My invention consists in the spring-tooth attachment, which comprises the block K, substantially rectangular, except as to an angular recess K' at the inner rear corner, and provided with grooves or channels $k$ in the under surface, adapted to receive the spring-teeth L L L, &c. Other means for effecting rigid connection may be substituted. This block is adapted to be secured to the swing-bar E at any desired position in the length of the latter by means of two bolts, one passing through the bolt-hole $k'$ and the other through either the bolt-hole $k^2$ or the bolt-hole $k^3$, the said two last-mentioned holes being side by side rearward from the bolt-hole $k'$, which is near the forward edge of the block. Two holes in the bar E, at a distance from each other corresponding to that between the bolt-holes $k'$ and either of the other bolt-holes in the block K, will receive the bolts, and, being in direct line fore and aft, will hold the block K, with the spring-teeth in direct fore-and-aft line when the hole $k^2$ is used for the rear bolt; but when the hole $k^3$ is used for that bolt the teeth will stand in oblique position and tend to turn the soil slightly inward, whereas when they stand facing directly forward they will simply tend to stir it without heaping it laterally.

It is important in the use of this class of devices that the operator should be able to see the tooth which is operating nearest to the row of corn being cultivated, so that he may constantly adjust the teeth laterally to keep clear of the corn, which may stand more or less irregularly in rows, and at the same time may cultivate close enough to the hills for effectiveness. The greater the range of lateral adjustment which can be obtained the more desirable the structure in that respect; but the driver's seat must not be located too far rearward to interfere with the balance of the machine, and in order that he may see the operation of the teeth while controlling the horses the tooth which he must watch—to wit, the inner one of the set—is necessarily located considerably forward of the position of the seat, and this brings said tooth forward of the vertical plane of the rear edge of the wheel, so that the block to which the teeth are fastened is limited in its lateral adjustment by the plane of the wheel.

For the purpose of causing the several teeth to do their work most effectively they should not stand all abreast, but with consecutive teeth far enough separated fore and aft so that the soil thrown aside by one tooth toward the adjacent tooth or shovel and falling in front of the latter may when thrown aside by the latter fall behind the former, and in order that refuse, straw, or stubble which the foremost tooth will throw aside in one direction or the other may to as large extent as possible be accumulated at the outer side, which would be midway between the rows, rather than at the inner side, which would be upon the rows of corn, and also so that such refuse may not accumulate in front of the entire gang of shovels and be carried forward bodily in accumulating quantity, the teeth should be arranged consecutively to the rear from the inner or next to the inner toward the outer of the series.

For the purpose of most thorough cultivation it is desirable to employ as many as four narrow teeth or shovels in the series, and in order to deliver the refuse outward and avoid blocking the teeth and require the minimum force to stir the soil at least three of the teeth should stand in oblique line trending outward and rearward from the foremost of the three. If all four teeth are placed in oblique line the fore-and-aft compass of the series is increased one-third, and as a consequence the difference in depth of the foremost and rearmost teeth when the swing-bar is adjusted vertically out of a horizontal line is correspondingly increased and the evenness of the work done diminished, so that either the foremost tooth is liable to be set too shallow for effectiveness or the outermost tooth so deep as to unduly increase the draft. Not less than three teeth, however, as above stated, should be arranged in oblique line, and the fore-and-aft compass of three teeth with two intervening spaces is the minimum desirable fore-and-aft compass of a series of four. The fourth tooth may be located in transverse line with either of the other three without increasing the fore-and-aft compass; but it should not be in transverse line with an adjacent tooth nor in transverse line with the second tooth from it if the intervening tooth is rearward of said transverse line, because there would thereby be formed a forwardly-open angle between the three successive teeth, in which refuse would accumulate and lodge and eventually blockade all three teeth. Only two positions for the fourth tooth are therefore consistent with the rules indicated. One of these positions is that shown in Fig. 3, wherein the fourth tooth is the outermost tooth and is in transverse line with the innermost, which is the foremost tooth, and the other position is shown in Fig. 4, wherein the fourth tooth is the innermost tooth, but not the foremost, nor in transverse line with the foremost. In order that the four spring-teeth may be secured to the block K in either of these two desirable arrangements at the preference of the operator and that the block should, while adapted to both arrangements, have no greater compass than the least which will so adapt it, and that it may not prevent the driver from observing the operation and position of the innermost tooth, the block must be wide enough to permit each tooth to be adjusted to the extreme positions which the two arrangements require. It will be observed that in the arrangement shown in Fig. 3 the outermost tooth is one of the foremost teeth, (the innermost tooth being also in the same transverse line,) and that in the arrangement shown in Fig. 4 the outermost tooth is the rearmost. Since there are but three fore-and-aft positions used in the entire set and this tooth occupies in the two arrangements the extremes of the three, it will be seen that the fore-and-aft extent of the block must be three times the minimum extent necessary to properly secure a tooth. The foremost tooth in either arrangement will have its point overhung by the block, and when the innermost is the foremost, as in the arrangement shown in Fig. 3, the block if continued in regular parallelogram to the inner rear corner would conceal the working point of the inner tooth from the driver and prevent him from observing its action for the purpose of adjusting the swing-bar laterally. Therefore, at the inner rear corner of the block I form the recess K'. When the innermost tooth is foremost, as in this arrangement, the second and third teeth are in the middle and rear positions, respectively, on the block, and the fourth and outermost is at the foremost position, and the block is provided with bolt-holes $k^4$, &c., for the purpose of attaching the teeth at these several positions. When the arrangement is changed to the form shown in Fig. 4, the second tooth is made the foremost, and the third falls into the middle space and the fourth into the rear space, the innermost tooth being then secured in the middle place. A third adjustment would be consistent with the rules laid down—to wit, the location of the innermost tooth at the rear place; but the formation of the recess K' to prevent its working point being concealed by the block when it is located at the foremost place prevents securing it at such third position.

I claim—

1. A spring-tooth attachment for a cultivator, consisting of the shovel block or bar K and four spring-teeth mounted thereon, said teeth being arranged with three in an oblique line and the fourth in transerse line with one of the three, to which it is not adjacent, the adjacent tooth being not located in the next space to the rear of said fourth tooth, substantially as set forth.

2. A spring-tooth attachment for a cultivator, consisting of the block K, having suitable fore-and-aft channels or grooves on its inner face and the spring-teeth lodged in such grooves, the block being provided with bolt-holes for securing the teeth, respectively, each in either of two positions on the block, substantially as and for the purpose set forth.

3. A spring-tooth attachment comprising the block K and the spring-teeth secured to its under side, provided with the bolt-hole $k'$ at the forward part and the two bolt-holes $k^2$ $k^3$ laterally separated toward the rear part, substantially as and for the purpose set forth.

4. A spring-tooth attachment for a cultivator, consisting of the block K and the four spring-teeth secured to its under side, said block being provided with bolt-holes for securing each of said teeth in two positions fore and aft and having the recess $K'$ at the inner rear corner, substantially as set forth.

In testimony whereof I have hereunto set my hand, in the presence of two witnesses, at Greenwood, Illinois, this 23d day of May, 1892.

D. E. HERRINGTON.

Witnesses:
 CHAS. S. BURTON,
 JEAN ELLIOTT.